United States Patent
Gnanamani et al.

(10) Patent No.: US 10,275,782 B2
(45) Date of Patent: Apr. 30, 2019

(54) VARIATION OF MINIMUM ADVERTISEMENT RELEVANCE QUALITY THRESHOLD BASED ON SEARCH QUERY ATTRIBUTES

(75) Inventors: Arun Kumar Gnanamani, Mountain View, CA (US); Ankur K. Gupta, Sunnyvale, CA (US)

(73) Assignee: Excalibur IP, LLC, New York, NY (US)

( * ) Notice: Subject to any disclaimer, the term of this patent is extended or adjusted under 35 U.S.C. 154(b) by 1592 days.

(21) Appl. No.: 12/979,769

(22) Filed: Dec. 28, 2010

(65) Prior Publication Data

US 2012/0166277 A1 Jun. 28, 2012

(51) Int. Cl.
*G06Q 30/02* (2012.01)
*G06F 16/951* (2019.01)

(52) U.S. Cl.
CPC .......... *G06Q 30/02* (2013.01); *G06F 16/951* (2019.01); *G06Q 30/0251* (2013.01)

(58) Field of Classification Search
CPC ...................................... G06Q 30/00–30/0284

USPC ............................................. 705/14.1–14.73
See application file for complete search history.

(56) References Cited

U.S. PATENT DOCUMENTS

| | | | |
|---|---|---|---|
| 7,778,872 B2 * | 8/2010 | Kamangar | G06Q 30/02 705/14.43 |
| 2009/0006207 A1 * | 1/2009 | Datar | G06Q 30/02 705/14.54 |

\* cited by examiner

*Primary Examiner* — John Van Bramer
(74) *Attorney, Agent, or Firm* — Brinks Gilson & Lione

(57) ABSTRACT

Query threshold values are determined to be used to select advertisements to be displayed in response to a search query. A query threshold value is determined for each query based on query attributes characterizing the query, such as a query frequency, query length, whether the query is a navigational query, etc. By generating a threshold value for each query, and using the query threshold value for selecting advertisements to be displayed for the query (e.g., selecting advertisements having quality scores greater than the query threshold value), the advertisements can better correspond to the query, and thus are more likely to be selected by the user. As a result, the user experience can be enhanced and the advertising revenue can be correspondingly increased.

20 Claims, 7 Drawing Sheets

| Query | Decile | Quality Score Threshold |
|---|---|---|
| Facebook | 1 | QST (D1) |
| Car Insurance | 2 | QST (D2) |
| Digital Camera | 3 | QST (D3) |
| California King Rhapsody queen style mattress set | 9 | QST (D9) |

| Query | # of Tokens | Quality Score Threshold |
|---|---|---|
| Facebook | 1 | QST (T1) |
| Car Insurance | 2 | QST (T2) |
| Digital Camera | 2 | QST (T2) |
| California King Rhapsody queen style mattress set | 7 | QST (T7) |

VARIATION OF MINIMUM ADVERTISEMENT RELEVANCE QUALITY THRESHOLD BASED ON SEARCH QUERY ATTRIBUTES

BACKGROUND OF THE INVENTION

Field of the Invention

The present invention generally relates to techniques for selecting advertisements in a sponsored search environment.

Background

Addressing the information needs of users has been one of the main goals of web search engines since their early days. Web search engines can provide fast and accurate results to user queries, usually for free. However, in order to provide this searching service free of charge, providers of search engines, such as Yahoo! Search™ (at http://www.yahoo.com), Ask.com™ (at http://www.ask.com), and Google™ (at http://www.google.com), typically offer advertising opportunities that finance their operating costs. Web search engines may provide advertisements to the users using a variety of techniques, including banner ads, pop-up ads, and sponsored search ads, among others. These advertisements may be provided to the user at various times and can be placed at various locations on a web page. Web search engine providers often get paid from the providers of the advertisements per user selection of each advertisement, e.g., per user click. Therefore it is beneficial for the web search engine providers to maximize the use of, and thus the profit obtained from, each advertisement shown to the user.

Sponsored search advertisements ("sponsored search ads") are advertisements that are selected based on received search queries received from users, and are placed on web pages that contain search results to the queries. Sponsored search ads are typically ranked by an advertisement selection system according to how well the features of the query (e.g., keywords of the query) match advertisements (e.g., match bid keywords associated with advertisements). The advertisements that best match the query features may be selected for display in response to the query. In some advanced advertisement selection systems, a quality score is calculated for each advertisement that corresponds to a relevancy of the advertisement to the search query. In such a system, advertisements are selected for placement on the search results web page by choosing the advertisements that have quality scores higher than a pre-determined threshold quality score.

However, such advanced advertisement selection systems typically use a universal pre-determined threshold quality score for all queries, which is not capable of taking into account different types of queries.

BRIEF SUMMARY OF THE INVENTION

Techniques are described for determining a query threshold value for selecting advertisements to be displayed in response to a search query. The query threshold value is determined on a query-by-query basis, based on query attributes characterizing a query, such as a query frequency, query length, a likelihood that the query is a navigational query, etc. By generating a threshold value for each query, and using the query threshold value for selecting advertisements to be displayed for the query (e.g., selecting advertisements having quality scores greater than the query threshold value), the selected advertisements can better correspond to the query, and thus are more likely to be selected by the user. As a result, the user experience can be enhanced and the advertising revenue can be correspondingly increased.

In one implementation, a method for determining a query threshold value is provided. A value is determined for one or more query attributes of a query submitted by a user to a search engine. Attribute threshold values corresponding to each of the query attribute value(s) may be determined A query threshold value is calculated for the query corresponding to the determined query attributes threshold value(s). The query threshold value specifies a minimum quality score for an advertisement to be selected in response to receiving the query.

In another implementation, a system for determining a query threshold value is provided. The system may include a query attribute value determiner and a query threshold value calculator. The query attribute value determiner is configured to determine a value for one or more query attributes of a query submitted by a user to a search engine. The query attribute value determiner may determine an attribute threshold value corresponding to each of the attribute value(s) to determine one or more attribute threshold values. The query threshold value calculator is configured to calculate a query threshold value for the query corresponding to the determined query attributes value(s). The query threshold value specifies a minimum quality score for an advertisement to be selected in response to receiving the query.

In still another implementation, a method for generating a mapping of query attribute values to query attribute threshold values is described. A set of previously submitted queries is received (e.g., from a query log). Query attribute values are determined for query attributes of each query in the set of previously submitted queries. Quality scores are received for advertisements received for the set of previously submitted queries. For each query attribute of the plurality of query attributes, the query attribute values for the query attribute are graphed versus the received advertisement quality scores, a mapping is generated of the query attribute values to quality score threshold values for the query attribute based the graphing, and the mapping generated for the query attribute is stored.

Computer program products are also described herein. The computer program products include a computer-readable medium having computer program logic recorded thereon for determining query threshold values for queries to be used to select advertisements, for generating a mapping of query attribute values to query attribute threshold values, and for enabling further embodiments, according to the implementations described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 1 is a block diagram of an information retrieval system in which an embodiment of the present invention may be implemented.

FIG. 4 depicts a table providing a mapping of query frequency attribute values to query frequency attribute threshold values, in accordance with an embodiment described herein.

FIG. 5 depicts a table providing a mapping of query length attribute values to query length attribute threshold values, in accordance with an embodiment described herein.

Figure 1:
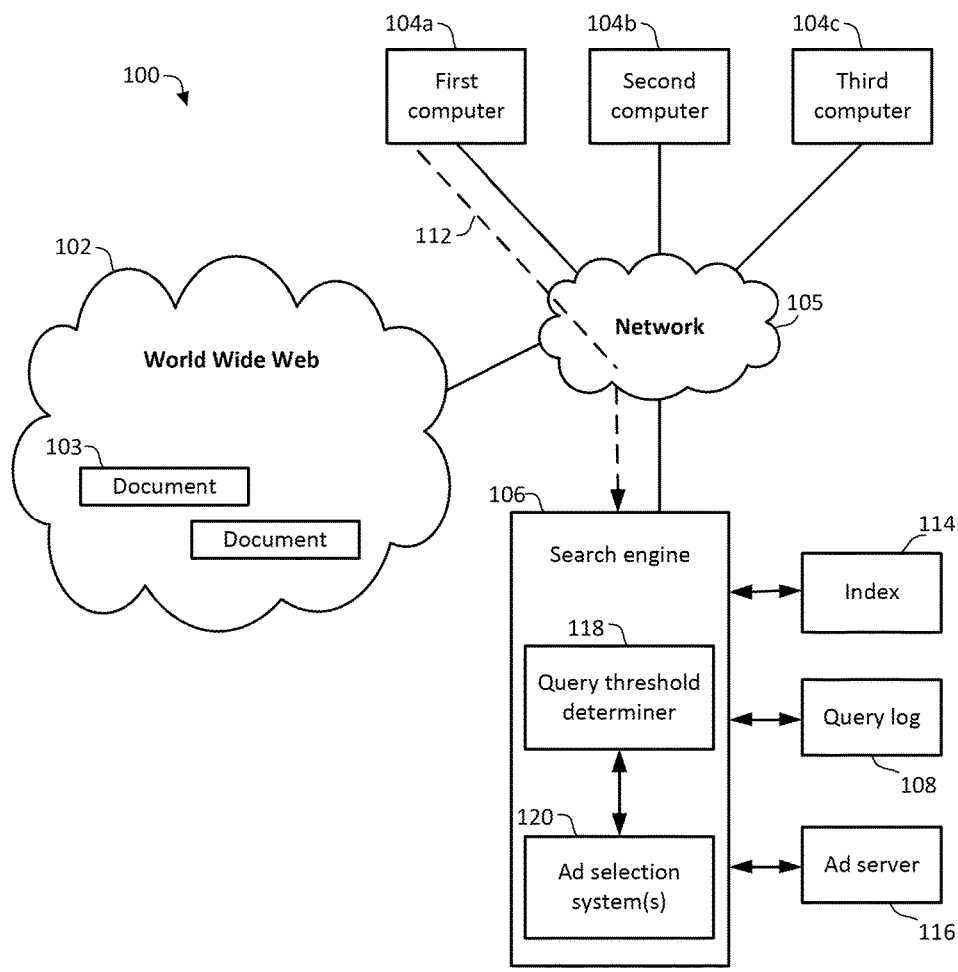

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described, Numerous exemplary embodiments of the present invention are described as follows. It noted that any section/subsection headings provided herein are not intended to be limiting. Embodiments are described throughout this document, and any type of embodiment may be included under any section/subsection.

Sponsored search advertisements ("sponsored search ads") are advertisements that are selected based on received search queries received from users, and are placed on web pages that contain search results to the queries. In sponsored search advertising, during the advertisement selection process, two major advertisement matching techniques are deployed. In a first type of matching technique, referred to as "exact match," a search query received from a user is matched with bidded keywords. According to a second type of matching technique, referred to as "advanced match," advertisement selection is based upon a combination of factors in addition to keyword matching (as in "exact match"). Keywords of the search query and features of a plurality of advertisements (e.g., for each advertisement, the advertisement creative, URL (uniform resource locator), and bidded keywords) are matched, and advertisements are ranked order by calculating a quality score based upon mathematical model.

According to the advanced matching technique, the quality scores are used to rank advertisements after selecting an array of advertisements based on one or more selection algorithms. A quality score is typically a numerical value that represents the relevancy of an advertisement to the user's search query based on how well the features of the query and advertisement matched for a the user. Advanced matching uses a universal quality threshold, so that any advertisement that has a quality score below the quality threshold is not considered relevant and not shown to the user.

In embodiments, the advertisement relevance quality threshold value is varied on a query-by-query basis, rather than using a universal quality threshold. In embodiments, the threshold value is determined for each search query based on query attributes characterizing the query, such as a query frequency, query length, whether the query is a navigational query, etc. By generating a threshold value for each query (a "query threshold value"), and using the query threshold value for selecting advertisements to be displayed for the query (e.g., selecting advertisements having quality scores greater than the query threshold value), the advertisements can better correspond to the query, and thus are more likely to be selected by the user. As a result, the user experience can be enhanced and the advertising revenue can be correspondingly increased.

For example, it may be desired for a query threshold value for a query that is directed to particular categories, such as research, etc., to be higher than for a query that is directed to a different category (e.g., shopping and/or other high commercial intent query attribute). A higher query threshold value (e.g., for the research query) limits a number of advertisements shown to the user on a web page that is generated in response to that query. A lower query threshold value (e.g., for the shopping query) enables a larger pool of advertisements to select from, to select advertisements to be placed and shown to the user on a web page that is generated in response to the shopping query.

Embodiments may be implemented in any suitable environment. For instance, FIG. 1 is a block diagram of an information retrieval system 100 in which an embodiment of the present invention may be implemented. System 100 is described herein for illustrative purposes only, and it is noted that embodiments of the present invention may be implemented in alternative environments. As shown in FIG. 1, system 100 includes a web search engine 106 (also referred to as a "search engine"). One or more computers 104, such as first computer 104a, second computer 104b and third computer 104c, are connected to a communication network 105. Network 105 may be any type of communication network, such as a local area network (LAN), a wide area network (WAN), or a combination of communication networks. In embodiments, network 105 may include the Internet and/or an intranet. Computers 104 can retrieve documents from entities over network 105. In embodiments where network 105 includes the Internet, a collection of documents, including a document 103, which form a portion of World Wide Web 102, are available for retrieval by computers 104 through network 105. On the Internet, documents may be identified/located by a uniform resource locator (URL), such as http://www.yahoo.com, and/or by other mechanisms. Computers 104 can access document 103 through network 105 by supplying a URL corresponding to document 103 to a document server (not shown in FIG. 1).

As shown in FIG. 1, search engine 106 is coupled to network 105. Search engine 106 accesses a stored index 114 that indexes documents, such as documents of World Wide Web 102. A user of computer 104a who desires to retrieve one or more documents relevant to a particular topic, but does not know the identifier/location of such a document, may submit a query 112 to search engine 106 through network 105. Search engine 106 receives query 112, and analyzes index 114 to find documents relevant to query 112. For example, search engine 106 may identify a set of documents indexed by index 114 that include terms of query 112. The set of documents may include any number of documents, including tens, hundreds, thousands, millions, or even billions of documents. Search engine 106 may use a ranking or relevance function to rank documents of the retrieved set of documents in an order of relevance to the user. Documents of the set determined to most likely be relevant may be provided at the top of a list of the returned documents in an attempt to avoid the user having to parse through the entire set of documents. The list of the returned documents may be provided in the context of a document termed a "search results page."

Search engine 106 may be implemented in hardware, software, firmware, or any combination thereof. For example, search engine 106 may include software/firmware that executes in one or more processors of one or more computer systems, such as one or more servers. Examples of search engine 106 that are accessible through network 105 include, but are not limited to, Yahoo! Search™ (at http://www.yahoo.com), Ask.com™ (at http://www.ask.com), and Google™ (at http://www.google.com).

Figure 2:
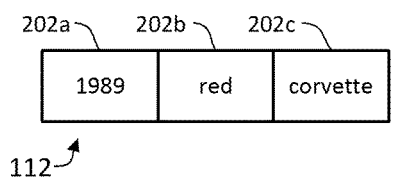
FIG. 2 shows an example query that may be submitted by a user to a search engine.

FIG. 2 shows an example query 112 that may be submitted by a user of one of computers 104a-104c of FIG. 1 to search engine 106. As shown in FIG. 2, query 112 includes one or more terms 202, such as first term 202a, second term 202b and third term 202c. Any number of terms 202 may be present in a query. As shown in FIG. 2, terms 202a, 202b and 202c of query 112 are "1989," "red," and "corvette," respectively. Search engine 106 applies these terms 202a-202c to index 114 to retrieve a document locator, such as a URL, for one or more indexed documents that match "1989," "red," and "corvette," and may return a list of such document(s) and their associated URL(s), wherein the list is sorted in accordance with a ranking.

As also shown in FIG. 1, search engine 106 may generate a query log 108. Query log 108 is a record of searches that are performed using search engine 106. Query log 108 may include a list of queries, by listing query terms (e.g., terms 202 of query 112) along with further information/attributes for each query, such as a list of documents identified based on the query, a list/indication of documents in the list that were selected/clicked on ("clicked") by a user reviewing the list, a ranking of clicked documents, a timestamp indicating when the query is received by search engine 106, an IP (internet protocol) address identifying a unique device (e.g., a computer, cell phone, etc.) from which the query terms were submitted, an identifier associated with a user who submits the query terms (e.g., a user identifier in a web browser cookie), and/or further information/attributes.

As shown in FIG. 1, system 100 also includes an advertisement server 116 connected to search engine 106. Advertisement server 116 may be a computer or other processing system, including one or more processors, that is capable of serving a plurality of advertisements, such as sponsored search advertisements, to search engine 106. Advertisement server 116 may receive the plurality of advertisements from one or more advertisers (not shown).

For example, a sponsor providing each advertisement (e.g., by using advertisement server 116) may pay the provider of search engine 106 for each time that the advertisement is selected by a user of search engine 106. The amount paid may be referred to as a "bid price." Thus, it is beneficial for the provider of search engine 106 to maximize the amount of times each advertisement (e.g., a sponsored search ad) is viewed and selected by a user, as that may directly provide financial benefit to the provider of search engine 106. In an example embodiment, advertisement selection system(s) 120 ranks advertisements for the query in order of a quality score assigned to each advertisement. The quality score may be calculated using a probability of a user selection of each advertisement if the advertisement is shown on a web page (i.e., web page of search results generated in response to the query) as well as a bid for the advertisement. These ranked advertisements are then further narrowed by using the query threshold value for the query.

As further shown in FIG. 1, search engine 106 also includes a query threshold determiner 118. Query threshold determiner 118 is configured to determine a query threshold value for each received query based on one or more query attributes of that query ("query attributes"). The query may be query 112 received by search engine 106 or other query. For instance, in an embodiment, query threshold determiner 118 may first determine one or more attribute threshold values based on the one or more query attributes, and then determine the query threshold value based on the attribute threshold values, as described below. In addition to generating a query threshold value for each query, query threshold determiner 118 may be configured to allow optimization of the attribute threshold values and/or optimization of the query threshold value in order to even better match the needs of the advertiser and/or user.

The query threshold value may be provided to advertisement selection system 120, which may select one or more advertisements, such as sponsored search advertisements, from a plurality of advertisements that may be provided by advertisement server 116. Advertisement selection system 120 may assign a quality score to each advertisement. The quality score may be a numerical value that indicates a relevancy of each advertisement to the query (e.g., query 112), such as based on how well features of the query match to that advertisement with respect to the user that generated the query. Advertisement selection system 120 may use one or more selection algorithms to generate the quality scores for each advertisement and/or to select the advertisements based on the quality scores. Advertisement selection system 120 may thus select one or more advertisements from the advertisements provided by advertisement server 116. Advertisement selection system 120 may use the query threshold value for the query to eliminate any of the selected advertisements that have quality scores lower than the query threshold value.

By generating and using a query threshold value specific to each query, the advertisements shown to the user can be chosen to better correspond to the query, and thus be more likely to be selected by the user. As a result, the user experience can be enhanced and the advertising revenue can be correspondingly increased. For example, query threshold determiner 118 can raise the query threshold value for queries where the user is not likely to expect advertisements to be shown (e.g., where the user would not be interested in viewing advertisements). Similarly, query threshold determiner 118 can lower the query threshold value for queries where the user is likely to expect advertisements to be shown (e.g., where the user would be interested in viewing advertisements). Query threshold determiner 118 can raise the query threshold value for queries where relatively high numbers of advertisements are likely to match the search query, and may lower the query threshold value for queries where sufficient enough numbers of advertisements are not likely to match the search query.

By determining a query threshold value for each query, query threshold determiner 118 can advantageously improve the experience of the user of search engine 106 as well as increase advertising revenue for the search engine provider. For example, in accordance with certain embodiments, such determination enables search engine 106 to regulate how many advertisements can be shown on a web page of search results for each query depending on query attributes of that query. This approach is an improvement over techniques using the universal threshold value, where different types of queries may match different numbers of advertisements.

Example embodiments for query threshold determiner 118, and for determining query threshold values for queries, are described in more detail below.

B. Example Embodiments for Determining a Query Threshold Value

Figure 3:
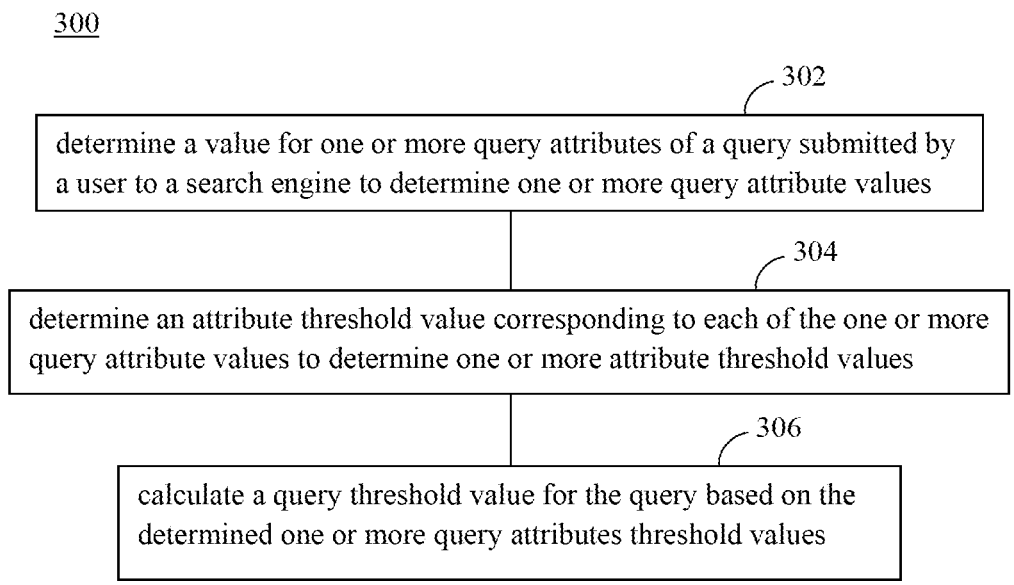
FIG. 3 depicts a flowchart providing a process for selecting advertisements for placement on web pages in accordance with an embodiment described herein.

Query threshold values may be determined on a query-by-query basis in various ways, in embodiments. For instance, FIG. 3 depicts a flowchart 300 of a process for determining a query threshold value in accordance with an embodiment described herein. Flowchart 300 may be modified by those skilled in the art in order to derive alternative embodiment(s). Also, the steps may occur in a different order than shown, some steps may be performed concurrently, some steps may be combined with other steps, and/or some steps may be absent, as desired. Flowchart is described as follows.

As shown in FIG. 3, flowchart 300 begins at step 302. In step 302, a value is determined for one or more query attributes of a query submitted by a user to a search engine to determine one or more query attribute values. For example, in an embodiment, query threshold determiner 118 of FIG. 1 may determine a value of one or more query attributes of a query submitted by a user to a search engine (e.g., query 112 submitted to search engine 106). The determined query attributes characterize the query in various ways. The query attributes may include one or more of a query frequency, a query length, a query navigationability, and/or other query attribute. These types of query attributes are described as follows.

A query frequency attribute is indicative of how often a query is submitted by users in search queries to the search engine (e.g., a popularity of the query). For example, query threshold determiner 118 may rank the number of times a query has been submitted to a search engine relative to the number of times every other query has been submitted to the search engine to determine a frequency ranking of the query as the query frequency attribute. The query may be categorized according to any category system, such as a decile category system (e.g., percentile categories, with each category having a range of 10%). For instance, the query may be placed in a decile category of 1-10 (where 1 corresponds to 0-10%, 2 corresponds to 10-20%, etc.), where queries in the 1 decile are most frequently submitted, and queries in the $10^{th}$ decile are least frequently submitted.

For instance, query threshold determiner 118 may determine that the query has a query decile value of 5, where the query decile value of 5 corresponds to queries in the 40-50% range.

In an embodiment, a query frequency attribute lookup table may be generated offline that maps queries to frequency attribute values (e.g., deciles). For instance, the query frequency attribute lookup table may list thousands or millions of possible queries (e.g., as listed query logs 638), and may include a calculated frequency attribute value for each query. The query frequency attribute lookup table may be accessed with a received query as key, to lookup the corresponding frequency attribute value.

A query length attribute is indicative of a number of tokens or terms in a query. For example, a query of "Facebook" has a query length of 1, because a single word, token, or term is included in "Facebook." A query of "Car Insurance" has a query length of 2 because two words, tokens, or terms are included. In some embodiments, two or more query words may be combined to form a single token (e.g., a query of "California King" and/or "New York" may each be considered to be a single token). It is noted that for queries with a high token length, (e.g., 10 terms), many advertisement selection algorithms may use fewer tokens (e.g., one, two, or three tokens) from that query when searching for a best match, and do not use the other tokens of that query. As such, a query length attribute value for a received query may be determined by counting the number of terms in the query. In an embodiment, terms are counted for a normalized form of a query, where some common terms are removed from the query (e.g., articles, conjunctions, etc.), plural versions of terms may be changed to singular, etc. Typically, in embodiments, a length of a received query may be calculated in real time by counting the number of terms in the received query (e.g., a number of terms in a normalized form of the query).

A query navigationability attribute is indicative of a likelihood of whether a query is a navigational query. A navigational query is a type of query where a user is searching for a specific domain. However, a navigational query does not include indicators of a domain, such as "http:", "www.", ".com", or other attribute of a URL. For instance, a user may submit a search query of "cnn" when searching for the domain for CNN (e.g., a URL of www.cnn.com). The likelihood of a received query being a navigational query may be determined in various ways. For example, received queries may be considered to be more likely to be a navigational query when they have a relatively high frequency of a single particular document/URL being selected (click-through rate, or CTR) by users from a list of documents/URLs provided in search results when the query is submitted. Received queries that are less likely to be navigational queries have a wider distribution of URLs that are selected when the query is submitted (e.g., may have multiple documents/URLs with relatively similar CTRs, rather than having a single URL that has a very high CTR).

For example, a query of "Facebook" has a high query navigationability because when entered as a search query, there is a high likelihood that the user is searching for the URL of "www.facebook.com." In embodiments, it may be desirable for queries with a high query navigationability to be provided with a relatively low query threshold value because there typically are not as many advertisements bidding on navigational queries, where the user intent is clear, and thus a chance of a user selecting a related advertisement is low.

In an embodiment, a query navigationability attribute lookup table may be generated offline that maps queries to navigationability attribute values (e.g., deciles). For instance, the query frequency attribute lookup table may list thousands or millions of possible queries (e.g., as listed query logs 638), and may include a determined navigationability attribute value for each query. Query navigationability attribute values may be numerical values or scores, or may be qualitative values. For instance, an entire range of query navigationability attribute values may be divided among several categories, such as the five categories of "extremely high," "high", "medium," "low," and "poor." Each query in the query navigationability attribute lookup table may be assigned a numerical and/or a qualitative query navigationability threshold values. The query navigationability attribute lookup table may be accessed with a received query as key, to lookup the corresponding navigationability attribute value.

Referring back to flowchart 300 in FIG. 3, in step 304, an attribute threshold value is determined corresponding to each of the one or more query attribute values to determine one or more attribute threshold values. In an embodiment, query threshold determiner 118 may determine an attribute threshold value for each query attribute based on the value of the one or more query attributes determined in step 302. For instance, an attribute threshold value may be determined for values of each of the query frequency attribute, query length attribute, query navigationability attribute, and/or other query attribute.

Attribute threshold values may be determined in various ways. For instance, in an embodiment, an attribute threshold value may be determined by mapping a value of the query attribute received in a search query to an attribute threshold value indicated in a query attribute map (e.g., a table, an array, or other data structure). The query attribute map may be pre-generated (e.g., offline) based on a history of received search queries and of the advertisements selected in response to the search queries. This historical data may be compiled using one or more search logs that contain the historical search queries.

An attribute threshold value may be determined for each of the query attributes (e.g., for each of the query frequency attribute, query length attribute, query navigationability attribute, etc.). However, in some embodiments one or more of the query attributes may not have a corresponding attribute threshold value, in which case either a default attribute threshold value may be used, or that attribute may not be used in the determination of the query threshold value.

In embodiments, query attribute maps may be generated by query threshold determiner 118 to be used for mapping values of query attributes of queries received in real time, such as query 112 of FIG. 1, to attribute threshold values. In this manner, the query attribute maps may be used to perform step 304 of flowchart 300 in FIG. 3. Example techniques for generating query attribute maps are described in a section further below. Examples of such attribute maps are shown in FIGS. 4 and 5 for purposes of illustration.

FIG. 4 depicts a table 400 that is representative of an example query frequency attribute map for the query frequency attribute, according to an example embodiment. Table 400 may be referenced to determine query frequency attribute threshold values based on query attribute values determined for a query (e.g., in step 302 of flowchart 300). Table 400 illustrates exemplary queries in a first column, such as queries of "Facebook," "Car Insurance," "Digital Camera," and "California King Rhapsody queen style mattress set." Deciles are indicated in the second column. In this example, in the second column, the query of "Facebook" has a frequency attribute value of "1," meaning that it falls into decile 1, which is indicative of most frequently used queries. For illustrative purposes, Table 400 represents query frequency attribute threshold values in a third column as "QST(X)" (quality score threshold), where "X" indicates the particular decile (e.g., decile 1 as "D1", decile 2 as "D2", etc.), rather than showing an actual numerical value for query attribute threshold values, because query attribute threshold values will vary depending on the set of queries from which they are generated. For instance, Table 400 illustrates queries having a query frequency attribute value of "1" as QST(D1) (e.g., calculated according to Equation 1 above).

FIG. 5 depicts a table 500 representative of an example query length attribute map for the query frequency attribute, according to an example embodiment. Table 500 may be referenced to determine query length attribute threshold values based on query attribute values determined for a query (e.g., in step 302 of flowchart 300). Table 500 illustrates exemplary queries in a first column, such as queries of "Facebook," "Car Insurance," "Digital Camera," and "California King Rhapsody queen style mattress set." Query lengths are indicated in the second column. In this example, the query of "Facebook" has a length attribute value of "1," meaning that it includes a single term or token. The query of "California King Rhapsody queen style mattress set" has a length attribute value of 7. However, in other embodiments, this query may have a smaller token length, as in some instances two or more query words may be combined to form a single token (e.g., "California King" may be considered to be a single token). For illustrative purposes, Table 500 represents query length attribute threshold values in a third column as "QST(Y)", where "Y" indicates the particular query length (e.g., length of 1 term as "T1", length of two terms as "T2", etc.), rather than showing an actual numerical value for query attribute threshold values, because query attribute threshold values vary depending on the set of queries from which they are generated. As illustrated in table 500, the attribute threshold values ("QST" in table 500) may be calculated using Equation 1 in a similar manner as described above with respect to FIG. 4.

In embodiments, query attribute maps may be stored in the form of tables, such as Tables 4 and 5 shown in FIGS. 4 and 5. The first columns of Tables 4 and 5, which show queries of the historical queries used to generate the maps, may be discarded in some embodiments where they are no longer needed. After query threshold determiner 118 receives a query, and determines query attribute values for the received query (in step 302 of flowchart 300), query threshold determiner 118 may obtain query attribute threshold values for the determined query attribute values by accessing the corresponding query attribute maps.

For instance, for a query frequency attribute value determined by query threshold determiner 118, query threshold determiner 118 may access a query frequency attribute map, such as Table 400 of FIG. 4, to determine the query frequency attribute threshold value. For instance, if the query frequency attribute value is 3 (e.g., for the query "red corvette"), query threshold determiner 118 may access Table 400 for the quality score threshold for the decile of 3, shown in Table 400 as QST(D3) (which is an actual numerical value in practice). For a query length attribute value determined by query threshold determiner 118, query threshold determiner 118 may access a query length attribute map, such as Table 500 of FIG. 5, to determine the query length attribute threshold value. For instance, if the query length attribute value is 2 (e.g., for the query "red corvette"), query threshold determiner 118 may access Table 500 for the quality score threshold for the query length of 2, shown in Table 500 as QST(T2) (which is an actual numerical value in practice).

For a query navigationability attribute value determined by query threshold determiner 118, query threshold determiner 118 may access a query navigationability attribute map to determine the query navigationability attribute threshold value. A query navigationability attribute map may be generated in a similar manner as the other types of attribute maps that maps query navigationability attribute values to query navigationability threshold values. Query navigationability attribute values may be numerical values or scores, or may be qualitative values. For instance, an entire range of query navigationability threshold values may be divide among several categories, such as the five categories of "extremely high," "high", "medium," "low," and "poor." Query threshold determiner 118 may access the query navigationability map for the query navigationability attribute threshold value in a similar fashion as maps are accessed for the query frequency attribute threshold value and query length attribute threshold value.

Referring back to flowchart 300 in FIG. 3, in step 306, a query threshold value is calculated for the query based on the determined one or more query attributes threshold values. For instance, query threshold determiner 118 may calculate the query threshold value for the query based at least on the value of the one or more query attribute threshold values determined in step 304. The query threshold value specifies a minimum quality score needed by an advertisement to be selected for placement on a web page generated in response to receiving the query.

In one embodiment, query threshold determiner 118 calculates the query threshold value by performing a weighted summation of the query attribute threshold values determined in step 304. Some of the attribute threshold values may be assigned less weight, more weight, or may not be used at all. Query threshold determiner 118 may assign weights to the one or more query attributes indicative of a relative importance of each respective query attribute in the calculation.

In one embodiment, calculation of the query threshold value may be performed in step 306 using Equation 1 (EQ. 1) shown below:

$$QST(q)=w1*QST(A1)+w2*QST(A2)+w3*QST(A3) \ldots +wn*QST(An), \quad \text{EQ. 1}$$

where
q is the query;
w1, w2, w3, . . . wn are tunable weights that reflect an importance given to each query attribute, such that w1+w2+w3, . . . +wn=1;

A1, A2, A3, . . . An are query attribute values determined for the query (e.g., A1 may be a value for the query frequency attribute, A2 may be a value for the query length attribute, etc. . . . ); and QST(A1), QST(A2), QST(A3), . . . QST(AN) are the attribute threshold values for the corresponding query attribute values.

When the query frequency attribute, query length attribute, and query navigationability attributes are the query attributes that are used, Equation 1 may be rewritten as Equation 2 (EQ. 2) shown below:

$$QST(q)=w1*QST(D)+w2*QST(T)+w3*QST(N), \quad \text{EQ. 2}$$

where
w1+w2+w3=1,
D=a value for the query frequency attribute,
T=a value for the query length attribute, and
N=a value for the query navigationability attribute.

As described above, the weights w1 . . . wn may be tuned to reflect the importance given to each query attribute. These weights may be tuned in order to reflect user's intent (e.g., a high commercial intent, which would give most importance to the commercial intent attribute threshold value). These weights may also be tuned depending on the market the query is addressing. In another example, if the user's intent is research (e.g., directed to searches on mathematical theorems), then the category attribute of research may be given more weight than the other attributes.

The query threshold value that is calculated in step 306 may be presented along with the query to one or more advertisement selection systems, such as advertisement selection system(s) 120. The advertisement selection system may select one or more advertisements to be displayed in response to the query with search results. The advertisement selection system may select advertisements having quality scores that are greater than the query threshold value, or may select the advertisements in another manner. Each of the advertisement selection systems may use a different algorithm to select the advertisements based on different criteria.

C. Example Query Threshold Determiner Embodiments

Figure 6A:
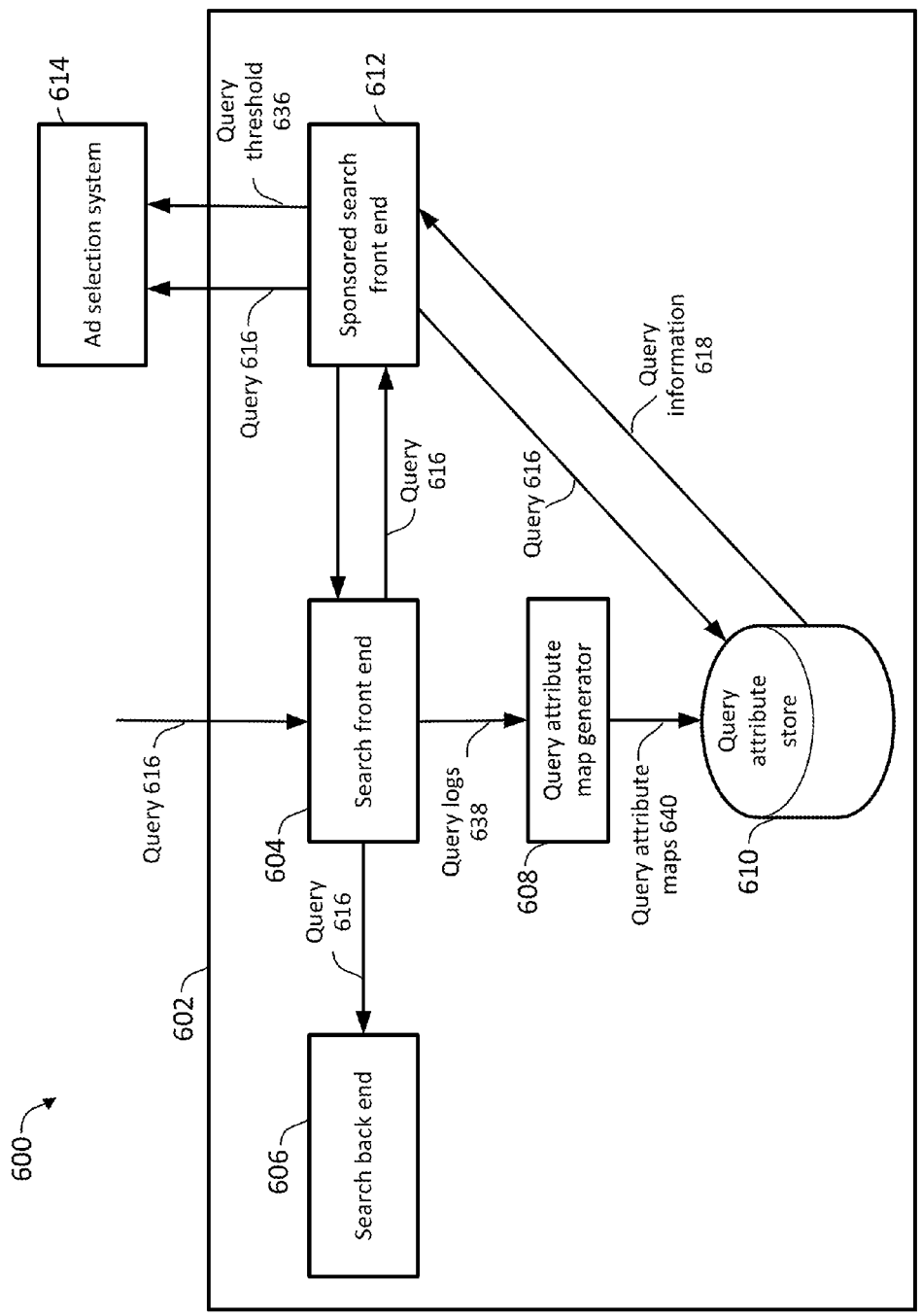
FIG. 6A shows a block diagram of an example of a search serving system, according to an example embodiment.

In embodiments, query threshold determiner 118 may be configured in various ways, and implemented in various environments, to determine query threshold values for queries. For instance, FIG. 6A shows an example search serving system 600 that includes a search system 602 and an advertisement selection system 614, according to an embodiment. Search system 602 includes a search front end 604, a search back end 606, a query attribute map generator 608, a query attribute store 610, and a sponsored search front end 612. Search system 602 is communicatively coupled to advertisement selection system 614, which is an example of advertisement selection system(s) 120 of FIG. 1.

Search front end 604 is configured to receive queries, such as a query 616 (e.g. query 112 of FIG. 1). Search front end 604 is an interface for search system 602 for receiving queries from users. For instance, search front end 604 may generate a search engine user interface (e.g., a web page displayable by a web browser) that provides a search engine entry box and search button that enable users to input queries. Search front end 604 may receive the query from a user computer, such as first computer 104a in FIG. 1. Search front end 604 may provide the query to search back end 606 and to sponsored search front end 612 for further processing. Search front end 604 may also provide query logs and/or search logs to query attribute map generator 608.

Search back end 606 receives query 616 from search front end 604. Search back end 606 is configured to generate algorithmic search results based on query 616. Search back end 606 may be configured to generate search results based on a received query in any manner, including according to techniques known to persons skilled in the relevant art(s). For instance, search back end 606 may determine a set of documents indexed by an index (e.g., index 114 of FIG. 1) that include terms of query 616 similarly to search engine 106, as described above. An indication of the set of documents may be included in search results.

Query attribute map generator 608 is configured to generate query attribute maps that map query attribute values to query attribute threshold values, as described above. Query attribute map generator 608 may generate the maps based on historical query information indicated in query log(s) 638. Query attribute map generator 608 may perform off-line processing to generate the query attribute maps, such as described above with reference to step 304. Query attribute map generator 608 stores the generated maps in query attribute store 610.

Query attribute store 610 is configured to store the generated query attribute maps generated by query attribute map generator 608. For instance, query attribute store 610 may store the maps in the form of tables (e.g., tables 400 and 500, with our with the first columns), arrays, or other data structures.

Sponsored search front end 612 receives query 616 from search front end 604, which requests sponsored advertisement listings from sponsored search front end 612. Sponsored search front end 612 is a communication interface for search system 602 with advertisement selection system 614. For instance, sponsored search front end 612 and advertisement selection system 614 may be located in a common computer system, or may communicate over a network, including a LAN, a WAN, or a combination of networks, such as the Internet.

Sponsored search front end 612 is further configured to calculate a query threshold value for query 616 according to embodiments described herein (e.g., flowchart 300, etc.). In one embodiment, sponsored search front end 612 may perform steps 302 and 304 of flowchart 300 by transmitting query 616 to query attribute store 610, as shown in FIG. 6A. In such an embodiment, query attribute store 610 may determine query attribute values for the query attributes of query 616 (e.g., using a lookup table, etc.), and may access corresponding query attribute maps stored by query attribute store 610 to map the determined query attribute values to query attribute threshold values. As shown in FIG. 6A, query attribute store 610 may transmit the determined query attribute values to sponsored search front end 612 in query information 618. Sponsored search front end 612 may calculate the query threshold value for query 616 (step 306) according to the query attribute threshold values received in query information 618.

In another embodiment, sponsored search front end 612 may perform step 302 of flowchart 300 by determining query attribute values for the query attributes of query 616 internally (e.g., using a lookup table, etc.). Sponsored search front end 612 may then perform step 304 by transmitting the determined query attribute values to query attribute store 610. Query attribute store 610 may access corresponding query attribute maps stored by query attribute store 610 to map the received query attribute values to query attribute threshold values. Query attribute store 610 may transmit the determined query attribute values to sponsored search front end 612 in query information 618. Sponsored search front end 612 may calculate the query threshold value for query 616 (step 306) according to the query attribute threshold values received in query information 618.

Sponsored search front end 612 transmits query 616 and query threshold value 636 in an advertisement request to advertisement selection system 614. In response, advertisement selection system 614 may select one or more advertisements to be displayed in response to query 616 with search results generated by search back end 606. Advertisement selection system 614 may select advertisements having quality scores that are greater than query threshold value 636, or may select the advertisements in another manner based on query threshold value 636.

Figure 6B:
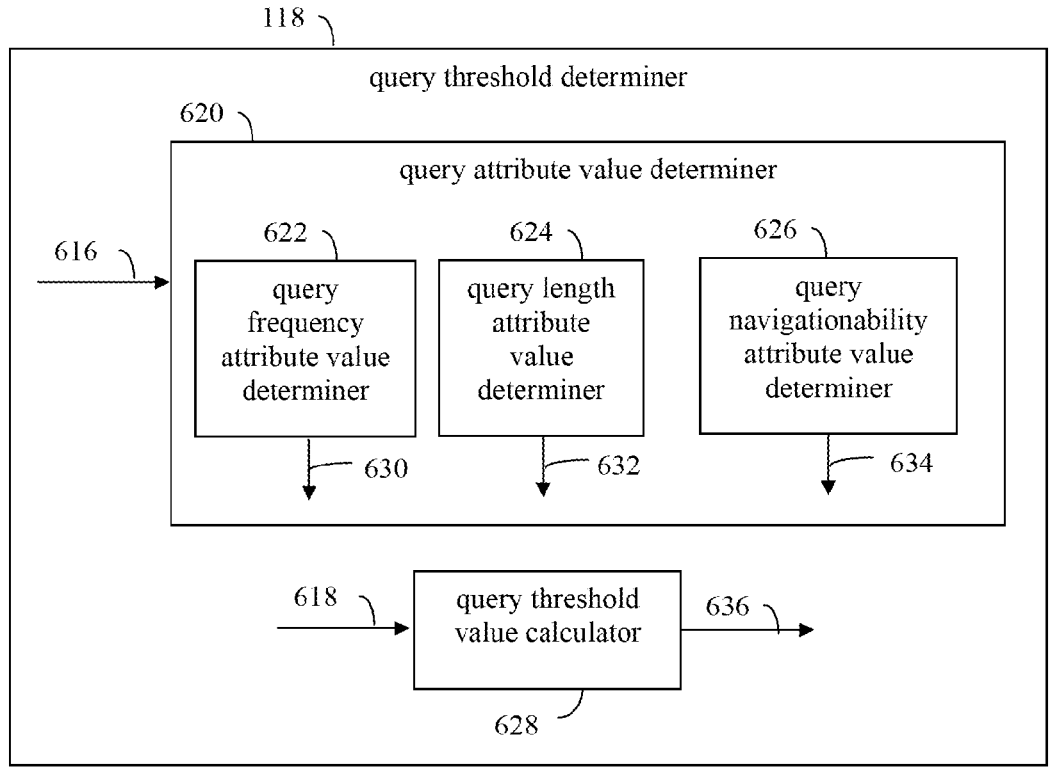
FIG. 6B shows a block diagram of a query threshold determiner configured to determine query threshold values for queries, according to an example embodiment.

Sponsored search front end 612 may be configured in various ways to perform its functions, in embodiments. FIG. 6B shows a block diagram of an example of query threshold determiner 118 that may be implemented in sponsored search front end 612, according to an embodiment. As shown in FIG. 6B, query threshold determiner 118 includes a query attribute value determiner 620 and a query threshold value calculator 628. Query attribute value determiner 620 includes a query frequency attribute value determiner 622, a query length attribute value determiner 624, and a query navigationability attribute value determiner 626. One or more of query frequency attribute value determiner 622, query length attribute value determiner 624, and query navigationability attribute value determiner 626 may be present, in embodiments. Query attribute value determiner 620 is configured to determine query attribute values for query 616, and query threshold value calculator 628 is configured to calculate query threshold value 636 based on the determined query attribute values. FIG. 6B is described as follows.

As shown in FIG. 6B, query attribute value determiner 620 receives query 616. In one embodiment, each of query frequency attribute value determiner 622, query length attribute value determiner 624, and query navigationability attribute value determiner 626 receive query 616, and determine a corresponding query attribute value. For instance, query frequency attribute value determiner 622 may determine a query frequency attribute value 630, query length attribute value determiner 624 may generate a query length attribute value 632, and query navigationability attribute value determiner 626 may determine a query navigationability attribute value 632. Query frequency attribute value determiner 622, query length attribute value determiner 624, and query navigationability attribute value determiner 626 may each determine the respective attribute value as described above (e.g., using lookup tables, etc.). In the embodiment of FIG. 6B, attribute values 630, 632, and 634 may be transmitted to query attribute store 610 to be mapped to corresponding query frequency, query length, and query navigationability attribute threshold values as described above, which may be provided to sponsored search front end 612 in query information 618.

Alternatively, as described above, query attribute value determiner 620 of FIG. 6B may transmit query 616 to query attribute store 610 to have query attribute values determined, and to have the determined query attribute values mapped to corresponding query frequency, query length, and query navigationability attribute threshold values as described above, which may be provided to sponsored search front end 612 in query information 618. In such an embodiment, query frequency attribute value determiner 622, query length attribute value determiner 624, and query navigationability attribute value determiner 626 may not need to be present.

As shown in FIG. 6B, query threshold value calculator 628 receives query information 618. Calculator 628 may be configured to calculate query threshold value based on the query frequency, query length, and query navigationability attribute threshold values received in query information 618 in any manner described herein, including according to Equations 2 or 3 (with or without weights w).

D. Example Query Attribute Map Generator Embodiments

Figure 6C:
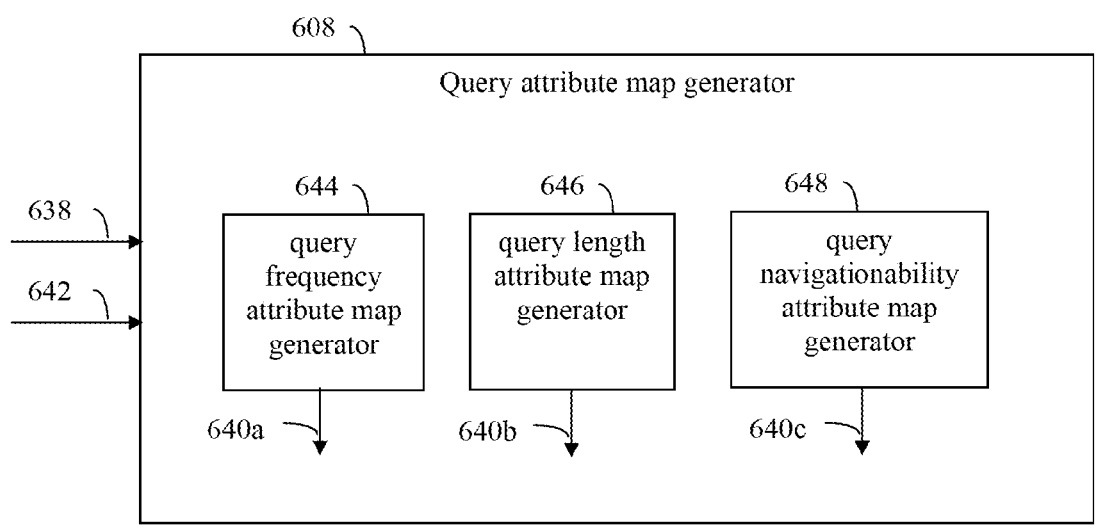
FIG. 6C shows a block diagram of a query attribute map generator configured to map query attribute values to query attribute quality score threshold values, according to an example embodiment.
Figure 7:
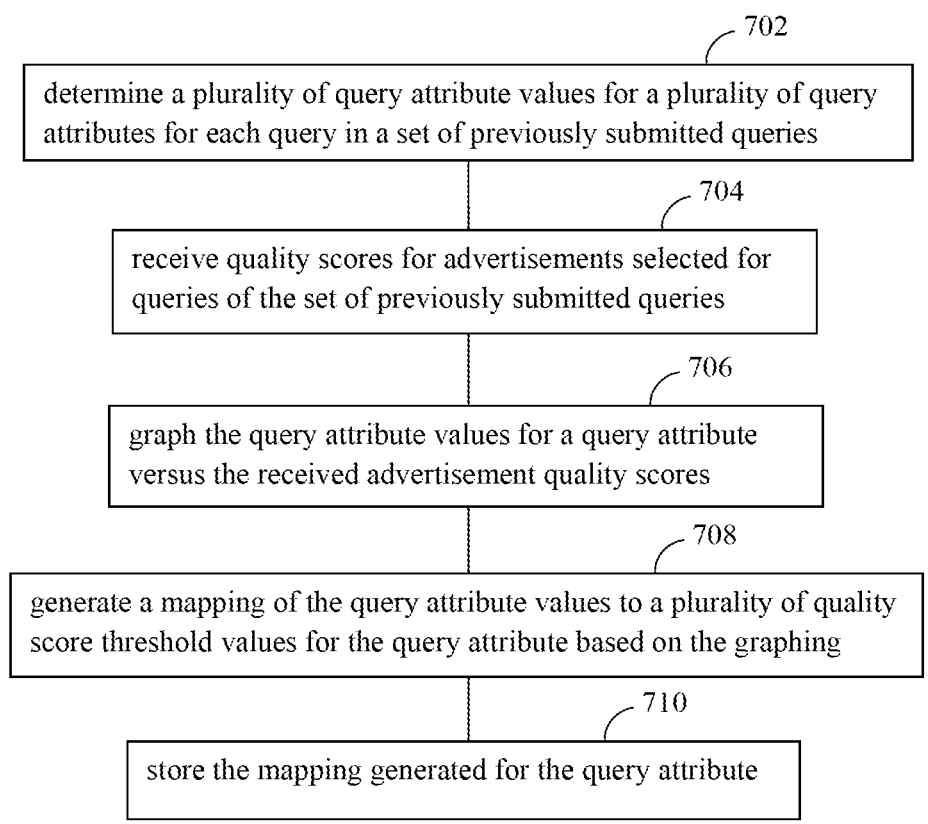
FIG. 7 shows a flowchart providing a process for mapping query attribute values to query attribute quality score threshold values, according to an example embodiment.

Query attribute map generator 608 of FIG. 6A may be configured in various ways to generate query attribute maps 620 based on query logs 638. For instance, FIG. 6C shows a block diagram of query attribute map generator 608 configured to map query attribute values to query attribute quality score threshold values, according to an example embodiment. As shown in FIG. 6C, query attribute map generator 608 may include one or more of a query frequency attribute map generator 644, a query length attribute map generator 646, and a query navigationability attribute map generator 648. Furthermore, FIG. 7 shows a flowchart 700 providing a process for mapping query attribute values to query attribute quality score threshold values, according to an example embodiment. In an embodiment, query attribute map generator 608 may perform flowchart 700 to generate query attribute maps 620. Further structural and operational embodiments will be apparent to persons skilled in the relevant art(s) based on the following description of flowchart 700.

Flowchart 700 begins with step 702. In step 702, a plurality of query attribute values is determined for a plurality of query attributes for each query in a set of previously submitted queries. In an embodiment, to generate query attribute maps for one or more query attributes, query attribute map generator 608 may process historical data, such query data for previously submitted queries stored in search logs (e.g., query log 108 of FIG. 1), such as query logs 638. In an embodiment, query attribute map generator 608 may process the historical data off-line, rather than in real-time. Query attribute map generator 608 may use any number of previously received queries ("historical queries") to generate query attribute maps, including thousands or even greater numbers of queries, which may be selected from one or more search logs in any manner, including randomly. Query attribute map generator 608 may determine values for query attributes for each of these historical queries. For example, referring to FIG. 6C, query frequency attribute map generator 644 may determine values for query frequency attributes, query length attribute map generator 646 may generate values for query length attributes, and query navigationability attribute map generator 648 may generate values for query navigationability attributes for each of the historical queries. The query attribute values may be determined for each historical query according to the techniques described above, and/or in alternative ways.

In step 704, quality scores are received for advertisements selected for queries of the set of previously submitted queries. For instance, as described above, an advertisement selection system may rank advertisements for received queries by generating a quality score for each advertisement. For example, the quality score may be calculated using a probability of a user selection of each advertisement if that advertisement is shown on a web page as well as a bid for the advertisement. Query attribute map generator 608 may receive the quality scores for the advertisements that were selected based on the historical queries of query logs 638 as advertisement quality scores 642, as shown in FIG. 6C. For instance, query attribute map generator 608 may receive the quality scores from advertisement selection system 614.

Steps 706, 708, and 710 are performed for each query attribute. In step 706, the query attribute values for a query attribute are graphed versus the received advertisement quality scores. Query attribute map generator 608 may generate a graph for each query attribute. For example, query frequency attribute map generator 644 may generate a graph of query frequency attributes versus the received advertisement scores, query length attribute map generator 646 may generate a graph of query length attributes versus the received advertisement scores, and query navigationability attribute map generator 648 may generate a graph of query navigationability attributes versus the received advertisement scores.

In step 708, a mapping is generated of the query attribute values to a plurality of quality score threshold values for the query attribute based on the graphing. For example, query attribute map generator 608 may analyze the graphs for each query attribute to determine quality score distributions. Based on the quality score distribution for each query attribute, a corresponding attribute map may be generated.

For instance, in one example with regard to the query frequency attribute, query frequency attribute map generator 644 may determine that historical queries having frequencies falling in the frequency deciles 3-5 are associated with advertisements with higher quality scores compared to other deciles. As a result, query frequency attribute map generator 644 may configure a frequency attribute map to provide a higher threshold (e.g., a higher query frequency attribute threshold value) for queries that have a query frequency attribute value in deciles 3-5. Continuing with this example, query frequency attribute map generator 644 may configure the frequency attribute map to provide a lower query frequency attribute threshold value for queries that have query frequencies falling in the deciles of 1-2 and 6-10. Query length attribute map generator 646 may configure a query length attribute map and query navigationability attribute map generator 648 may configure a query navigational attribute map in a similar manner based on distributions in graphs of quality scores versus query length attribute values and query navigational attribute values, respectively, for the historical queries.

In an embodiment, in step 706 described above, a set of three graphs may be generated for each query attribute, including a "top quality score" graph, a "minimum quality score" graph, and an "average quality score" graph. In a top quality score graph, the quality score of the top ad is plotted, where the ads are sorted by descending order of quality score (which is the case usually) such that the top most ad is the most relevant. In a minimum quality score graph, the quality score of the ad having the least difference above the quality threshold is plotted. In an average quality score graph, the average quality score of all of the quality scores of all qualifying ads for the query for the query is plotted. Attribute maps for each query attribute may be generated according to step 708 by each of map generators 644, 646, and 648, according to the distributions present in the graphs.

For instance, attribute threshold values may be generated to be included in the attribute maps for different categories of each query attribute. In one embodiment, an attribute threshold value (quality score threshold—QST) may be calculated according to Equation 3 (EQ. 3) shown below:

$$QST(AV) = (alpha*minQST(AV) + beta*maxQST(AV) + gamma*avgQST(AV))/3, \qquad \text{EQ. 3}$$

where

AV is a tabulated value of the query attribute;

alpha, beta, and gamma are constants that may be determined experimentally, each having a value between 0 and 1; and minQST, maxQST, and avg QST are thresholds determined from the distribution of minimum quality score, maximum quality score, and average quality score of all advertisements for a query having the query attribute, as described above.

Equation 3 may be used to generate a range of attribute threshold values for a range of categories of each query attribute. For instance, an attribute threshold value may be generated by query frequency attribute map generator 644 for each decile of the query frequency attribute, an attribute threshold value may be generated by query length attribute map generator 646 for each number of terms of the query length attribute, and an attribute threshold value may be generated by query navigationability attribute map generator 648 for each category of the query navigationability attribute.

Query threshold determiner 118 may calibrate the calculation of the attribute threshold value according Equation 3 to one or more objectives. Example objectives may include calibrating to obtain a best coverage of advertisements, or to maximize potential revenue from showing the advertisements to the user. Depending on the optimization objectives, one or more of the alpha, beta, and gamma constants of Equation 3 may be minimized or even set to zero in order to emphasize the minimum quality score, maximum quality score, or average quality score, respectively. For example, to obtain the best coverage of advertisements, the beta constant of Equation 3 associated with maxQST (maximum quality score) may be given more relative weight, while the other two constants (alpha and gamma) may be minimized or even set to zero. In another example, if the optimization objective is total revenue obtained from the advertisements, then all three constants may be assigned a similar relative importance, such each being assigned a value of 1.

In step 710, the mapping generated for the query attribute is stored. For instance, as shown in FIG. 6A, query attribute map generator may store query attribute maps 640, which includes each of the generated query attribute maps, in query attribute store 610.

E. Example Computer System Implementations

Search engine 106, query threshold determiner 118, advertisement selection system(s) 120, search serving system 600, search system 602, search front end 604, search back end 606, query attribute map generator 608, sponsored search front end 612, ad selection system 614, query attribute value determiner 620, query frequency attribute value determiner 622, query length attribute value determiner 624, query navigationability attribute value determiner 626, query threshold value calculator 628, query frequency attribute map generator 644, query length attribute map generator 646, query navigationability attribute map generator 648, and query threshold determiner 650 may be implemented in hardware, software, firmware, or any combination thereof. For example, search engine 106, query threshold determiner 118, advertisement selection system(s) 120, search serving system 600, search system 602, search front end 604, search back end 606, query attribute map generator 608, sponsored search front end 612, ad selection system 614, query attribute value determiner 620, query frequency attribute value determiner 622, query length attribute value determiner 624, query navigationability attribute value determiner 626, query threshold value calculator 628, query frequency attribute map generator 644, query length attribute map generator 646, query navigationability attribute map generator 648, and/or query threshold determiner 650 may be implemented as computer program code configured to be executed in one or more processors. Alternatively, search engine 106, query threshold determiner 118, advertisement selection system(s) 120, search serving system 600, search system 602, search front end 604, search back end 606, query attribute map generator 608, sponsored search front end 612, ad selection system 614, query attribute value determiner 620, query frequency attribute value determiner 622, query length attribute value determiner 624, query navigationability attribute value determiner 626, query threshold value calculator 628, query frequency attribute map generator 644, query length attribute map generator 646, query navigationability attribute map generator 648, and/or query threshold determiner 650 may be implemented as hardware logic/electrical circuitry.

Figure 8:
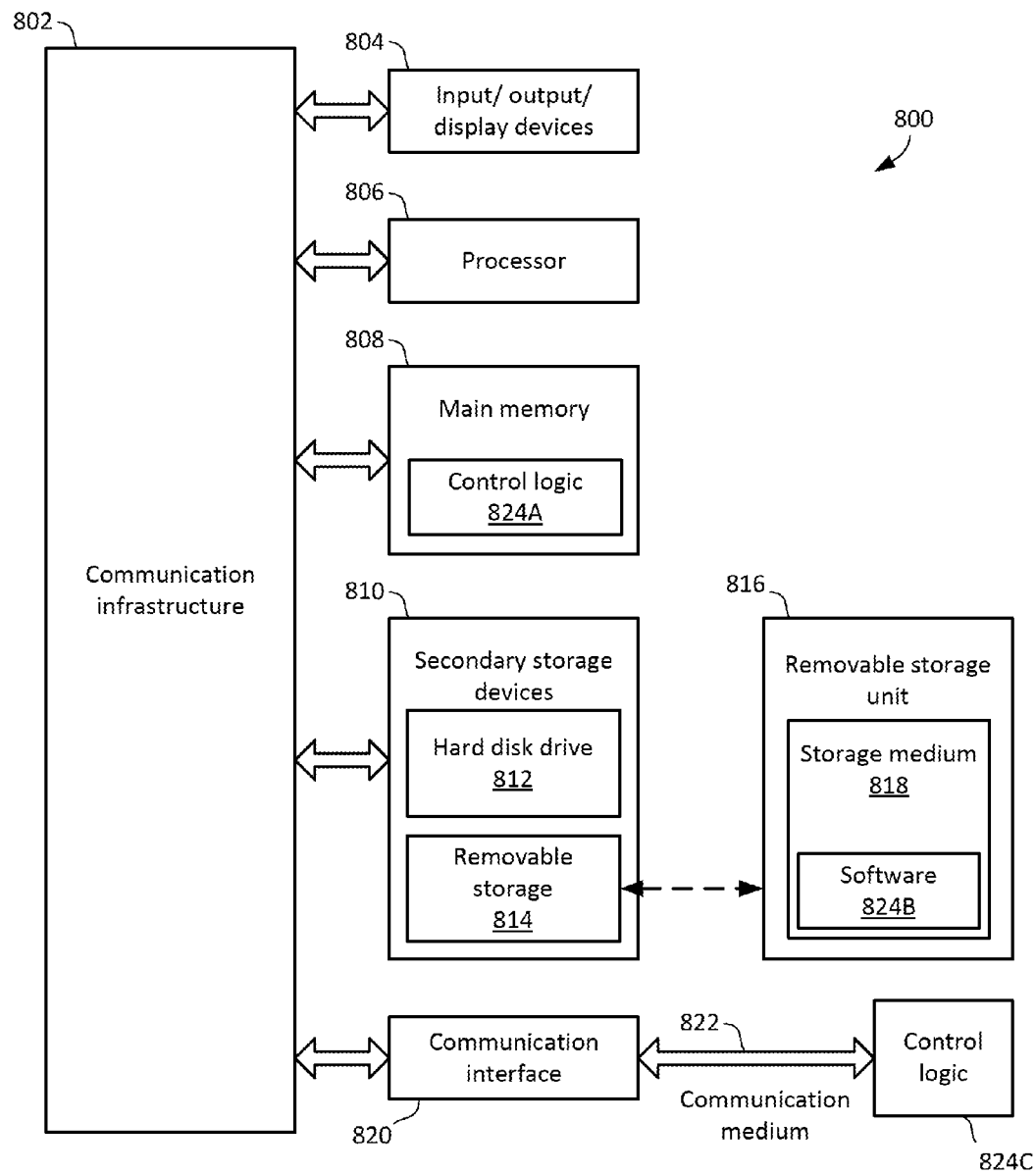
FIG. 8 is a block diagram of an example computer system that may be used to implement embodiments described herein.

The embodiments described herein, including systems, methods/processes, and/or apparatuses, may be implemented using well known servers/computers, such as computer 800 shown in FIG. 8. For example, search engine 106, query threshold determiner 118, advertisement selection system(s) 120, search serving system 600, search system 602, advertisement selection system 614, the methods of flowcharts 300 and 700, and further embodiments, can be implemented using one or more computers 800.

Computer 800 can be any commercially available and well known computer capable of performing the functions described herein, such as computers available from International Business Machines, Apple, Sun, HP, Dell, Cray, etc. Computer 800 may be any type of computer, including a desktop computer, a server, etc.

Computer 800 includes input/output/display devices 804, such as monitors, keyboards, pointing devices, etc.

Computer 800 includes one or more processors (also called central processing units, or CPUs), such as a processor 806. Processor 806 is connected to a communication infrastructure 802, such as a communication bus. In some embodiments, processor 806 can simultaneously operate multiple computing threads.

Computer 800 also includes a primary or main memory 808, such as random access memory (RAM). Main memory 808 has stored therein control logic 824A (computer software), and data.

Computer 800 also includes one or more secondary storage devices 810. Secondary storage devices 810 include, for example, a hard disk drive 812 and/or a removable storage device or drive 814, as well as other types of storage devices, such as memory cards and memory sticks. For instance, computer 800 may include an industry standard interface, such a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 818 having stored therein computer software 824B (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well known manner.

Computer 800 further includes a communication or network interface 820. Communication interface 820 enables computer 800 to communicate with remote systems and devices. For example, communication interface 820 allows computer 800 to communicate over communication networks or mediums 822, such as LANs, WANs, the Internet, etc. Network interface 820 may interface with remote sites or networks via wired or wireless connections.

Control logic 824C may be transmitted to and from computer 800 via the communication medium 822. More particularly, computer 800 may receive and transmit carrier waves (electromagnetic signals) modulated with control logic 824C via communication medium 822.

Any apparatus or manufacture comprising a computer useable or readable medium having control logic (software) stored therein is referred to herein as a computer program product or program storage device. This includes, but is not limited to, computer 800, main memory 808, secondary storage devices 810, and removable storage unit 816. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for search engine 106, query threshold determiner 118, advertisement selection system(s) 120, search serving system 600, search system 602, search front end 604, search back end 606, query attribute map generator 608, sponsored search front end 612, ad selection system 614, query attribute value determiner 620, query frequency attribute value determiner 622, query length attribute value determiner 624, query navigationability attribute value determiner 626, query threshold value calculator 628, query frequency attribute map generator 644, query length attribute map generator 646, query navigationability attribute map generator 648, query threshold determiner 650, flowchart 300, flowchart 700 (including any one or more steps of flowcharts 300 and 700), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

D. Conclusion

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A search system for determining a query threshold value, the search system comprising:
   a non-transitory computer-readable storage medium storing a set of instructions for determining the query threshold value;
   a processor, in communication with the non-transitory computer-readable storage medium, the processor configured to execute the set of instructions stored in the non-transitory computer-readable storage medium and configured to:
   receive a query;
   determine a query attribute value for each of two or more query attributes for the query, wherein the two or more query attributes include a query navigationability attribute;
   generate a map of previous query attribute values to previous quality score threshold values for each of the two or more query attributes wherein the previous query attribute values are derived from previously submitted queries;
   update the map with the query attribute value for each of the two or more query attributes; and
   calculate the query threshold value for the query based on the updated map, wherein the query threshold value specifies a minimum quality score for an advertisement to be selected in response to the receiving of the query.

2. The search system of claim 1, wherein the processor is further configured to:
   determine an attribute threshold value corresponding to each of the two or more query attributes, according to the map; and
   calculate the query threshold value further based on the corresponding attribute threshold values.

3. The search system of claim 2, wherein the processor is further configured to perform a weighted summation of the attribute threshold values to calculate the query threshold value for the query.

4. The search system of claim 2, wherein the processor is further configured to:
   receive the previously submitted queries,
   determine query attribute values for the two or more query attributes for each query of the previously submitted queries,
   receive quality scores for advertisements selected for queries of the previously submitted queries; and
   for each query attribute of the two or more query attributes, generate a map of the query attribute values to the corresponding attribute threshold values.

5. The search system of claim 1, wherein the two or more query attributes include a query frequency attribute that is indicative of a frequency of a query being submitted to a search engine in a search request, and
   wherein the processor is further configured to generate a map of query frequency attribute values to query frequency attribute quality score threshold values.

6. The search system of claim 1, wherein the two or more query attributes include a query length attribute that is indicative of a number of query terms in the query, and wherein the processor is further configured to generate a map of query length attribute values to query length attribute quality score threshold values.

7. The search system of claim 1, wherein the query navigationability attribute is indicative of a likelihood of the query being a navigational query, and
wherein the processor is further configured to generate a map of query navigationability attribute values to query navigationability attribute quality score threshold values.

8. The search system of claim 1, wherein the quality score for the advertisement is indicative of a relevancy of the advertisement to the query based on a match between one or more features of the query to the advertisement.

9. The search system of claim 8, wherein at least one advertisement having an associated quality score greater than the calculated query threshold value is selected for display in response to the receiving of the query.

10. A computer-implemented method for determining a query threshold value, comprising:
receiving, with a processor, a set of previously submitted queries;
determining, with a processor, a plurality of query attribute values for a plurality of query attributes for each query in the set of previously submitted queries, the plurality of query attributes including a query navigationability attribute;
receiving, with a processor, quality scores for advertisements received for the set of previously submitted queries; and
for each query attribute of the plurality of query attributes,
graphing, with a processor, the query attribute values for the query attribute versus the received advertisement quality scores,
generating, with a processor, a mapping of the query attribute values to a plurality of quality score threshold values for the query attribute based the graphing, and
storing, with a processor, the mapping generated for the query attribute.

11. The computer-implemented method of claim 10, wherein the plurality of query attributes comprise at least one of a query frequency attribute indicative of a frequency of a query being submitted to a search engine in a search request, a query length attribute that is indicative of a number of query terms in the query, or a query navigationability attribute that is indicative of a likelihood of the query being a navigational query, and the generating a mapping comprises:
mapping, with a processor, at least one of query frequency attribute values, query length attribute values, or query navigationability attribute values to query attribute quality score threshold values.

12. A computer-implemented method for determining a query threshold value, the method comprising:
receiving, with a processor, a query;
determining, with a processor, a query attribute value for each of two or more query attributes for the query;
generating a map of previous query attribute values to previous quality score threshold values for each of the two or more query attributes wherein the previous query attribute values are derived from previously submitted queries;
updating the map with the query attribute value for each of the two or more query attributes; and
calculating, with a processor, a query threshold value for the query based on the updated map, wherein the query threshold value specifies a minimum quality score for an advertisement to be selected in response to the receiving of the query.

13. The computer-implemented method of claim 12, wherein calculating the query threshold value for the query comprises:
determining, with a processor, an attribute threshold value corresponding to each of the two or more query attributes, according to the map; and
calculating the query threshold value further based on the corresponding attribute threshold values.

14. The computer-implemented method of claim 13, wherein calculating the query threshold value further comprises performing a weighted summation of the attribute threshold values.

15. The computer-implemented method of claim 13, further comprising:
receiving, with a processor, the previously submitted queries;
determining, by a processor, query attribute values for the two or more query attributes for each query of the previously submitted queries;
receiving, with a processor, quality scores for advertisements selected for queries of the previously submitted queries; and
for each query attribute of the the two or more query attributes,
generating, with a processor, a mapping of the query attribute values to the corresponding attribute threshold values.

16. The computer-implemented method of claim 12, wherein the two or more query attributes comprise a query frequency attribute that is indicative of a frequency of a query being submitted to a search engine in a search request, and
wherein generating a mapping comprises:
mapping, with a processor, query frequency attribute values to query frequency attribute quality score threshold values.

17. The computer-implemented method of claim 12, wherein the two or more query attributes comprise a query length attribute that is indicative of a number of query terms in the query, and
wherein generating a mapping comprises:
mapping, with a processor, query length attribute values to query length attribute quality score threshold values.

18. The computer-implemented method of claim 12, wherein the two or more query attributes comprise a query navigationability attribute that is indicative of a likelihood of the query being a navigational query, and
wherein generating a mapping comprises:
mapping, with a processor, query navigationability attribute values to query navigationability attribute quality score threshold values.

19. The computer-implemented method of claim 12, wherein the quality score for the advertisement is indicative of a relevancy of the advertisement to the query based on a match between one or more features of the query to the advertisement.

20. The computer-implemented method of claim 19, further comprising:
selecting, with a processor, one or more advertisements having associated quality scores greater than the calculated query threshold value for display in response to receiving the query.

* * * * *